Feb. 20, 1923.

A. F. BURKHOLDER.
PARING KNIFE.
FILED JULY 28, 1921.

1,445,746.

A. F. Burkholder
Inventor,

By
Attorneys

Patented Feb. 20, 1923.

1,445,746

UNITED STATES PATENT OFFICE.

ABRAHAM F. BURKHOLDER, OF TOLEDO, OHIO.

PARING KNIFE.

Application filed July 28, 1921. Serial No. 488,196.

*To all whom it may concern:*

Be it known that I, ABRAHAM F. BURKHOLDER, a citizen of the United States, residing at Toledo, in the county of Lucas and State of Ohio, have invented new and useful Improvements in Paring Knives, of which the following is a specification.

This invention relates to knives designed more particularly for paring fruits and vegetables, and its object is to provide a novel and improved knife of this kind which can be used with either hand, two opposite cutting edges being provided for this purpose, and the same being provided with a gage and guide device as will be described hereinafter.

Figure 1:
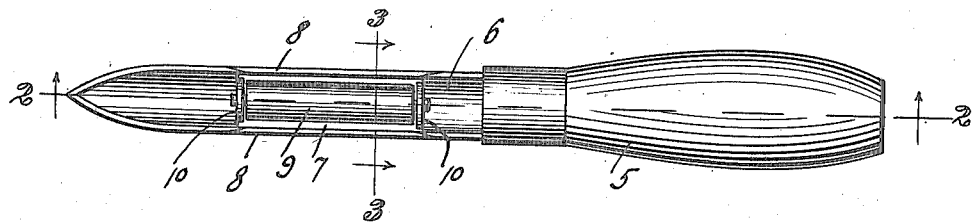
Figure 2:
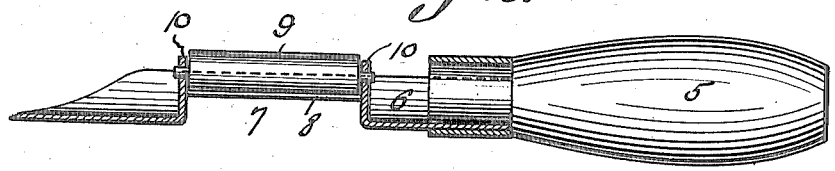

In order that the invention may be better understood, reference is had to the accompanying drawing in which;

Figure 1 is a plan view of the knife; Fig. 2 is a longitudinal section thereof on the line 2—2 of Fig. 1, and Fig. 3 is a cross section of the line 3—3 of Fig. 1.

Referring specifically to the drawing, 5 denotes a suitable wooden or other handle having rigidly attached to its forward end a forwardly extending blade 6 which is curved to obtain a channeled cross-section. The forward end of the blade is pointed, as clearly shown in Fig. 1 for removing eyes from potatoes, etc.

Figure 3:
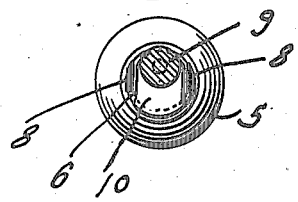

Intermediate its ends, the base portion of the blade 6 is made with a longitudinal recess 7 which leaves two parallel and opposite side portions 8 of the channel, which are spaced laterally and have their outer edges sharpened as clearly shown in Fig. 3 to form a pair of cutting portions which are located on opposite sides of the longitudinal center line of the blade 6. Between the cutting portions 8 is located a guide and gage roller 9, the same being supported by inturned ears 10 integral with the blade 6 and located at the ends of the recess 7.

In use, either cutting portion 8 may be used according to which hand grasps the knife, and hence the knife is right and left-handed. The roller 9 is parallel and close to the cutting edges of the parts 8, and it serves as a gage to determine the thickness of the parings, and also as a guide to carry the parings away from the cutting edges. The parts 8 are narrow and hence they can readily follow uneven portions of the surface of the potatoes or other vegetables or fruit being pared.

I claim—

1. A paring knife comprising a handle, and a blade carried by the handle, said blade having a channeled cross section, the opposite sides of the channel having their edges sharpened to form a pair of opposite and laterally spaced cutting edges, and a gage roller positioned between said cutting edges, parallel thereto and in spaced relation therewith.

2. A paring knife comprising a handle, and a blade carried by the handle, said blade having a channeled cross section, the opposite sides of the channel being sharpened to form a pair of opposite and laterally spaced cutting edges, and said blade having a base recess at the site of the sharpened side portions, and provided with inturned ears at the ends of the recess, and a gage roller supported by said ears, said roller being positioned between the aforesaid cutting edges, parallel thereto and in spaced relation therewith.

In testimony whereof I affix my signature.

ABRAHAM F. BURKHOLDER.